(12) United States Patent
Naito (10) Patent No.: US 8,553,991 B2
(45) Date of Patent: Oct. 8, 2013

(54) CLUSTERING PROCESSING APPARATUS AND CLUSTERING PROCESSING METHOD

(75) Inventor: Satoshi Naito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 13/160,946

(22) Filed: Jun. 15, 2011

(65) Prior Publication Data

US 2011/0317927 A1    Dec. 29, 2011

(30) Foreign Application Priority Data

Jun. 29, 2010 (JP) .................................. 2010-148027

(51) Int. Cl.
*G06K 9/62* (2006.01)
(52) U.S. Cl.
USPC ............................ 382/225; 382/159; 704/245
(58) Field of Classification Search
USPC .................. 382/225, 159; 704/231, 245, 267
See application file for complete search history.

(56) References Cited

U.S. PATENT DOCUMENTS

| 5,850,475 | A | 12/1998 | Kasao | |
|---|---|---|---|---|
| 7,623,712 | B2 | 11/2009 | Dai et al. | |
| 7,643,033 | B2 * | 1/2010 | Sekine et al. | 345/582 |
| 7,937,269 | B2 * | 5/2011 | Aggarwal et al. | 704/245 |
| 8,024,155 | B2 * | 9/2011 | Ogiwara et al. | 702/189 |
| 8,116,543 | B2 * | 2/2012 | Perz et al. | 382/128 |
| 8,218,881 | B2 * | 7/2012 | Okawa | 382/225 |
| 2003/0046253 | A1 * | 3/2003 | Shetty et al. | 706/1 |
| 2008/0021649 | A1 * | 1/2008 | Choy et al. | 702/1 |
| 2010/0110103 | A1 * | 5/2010 | Ramirez et al. | 345/619 |
| 2011/0103700 | A1 * | 5/2011 | Haseyama | 382/225 |
| 2011/0317927 | A1 * | 12/2011 | Naito | 382/225 |

FOREIGN PATENT DOCUMENTS

| JP | 830787 A | 2/1996 |
|---|---|---|
| JP | 2007158725 A | 6/2007 |

* cited by examiner

*Primary Examiner* — Gregory M Desire
(74) *Attorney, Agent, or Firm* — Fitzpatrick, Cella, Harper & Scinto (57) ABSTRACT

A clustering processing apparatus comprises: N clustering units that group samples included in the data block into clusters, each clustering unit sequentially taking each sample as a target, grouping the target sample into one of the clusters within the data block, storing cluster information including identification on each cluster into which the samples are grouped within the data block, and storing sample assignment information indicating the cluster to which the target sample belongs; a cluster information transferring unit that selects cluster information on a cluster to be integrated from the cluster information when a predetermined condition is met, and transfers the selected cluster information to a third storage unit; and an updating unit that integrates clusters selected based on the cluster information stored in the third storage unit into an integrated cluster, and updates the sample assignment information based on information of the integrated clusters.

10 Claims, 12 Drawing Sheets

CLUSTERING PROCESSING APPARATUS AND CLUSTERING PROCESSING METHOD

BACKGROUND OF THE INVENTION

1. Field of the Invention

The present invention relates to pattern recognition and data analysis in image processing and statistical processing, and more particularly to an apparatus and a method for data clustering.

2. Description of the Related Art

Recently, demand for keeping or transmitting documents in digitized form rather than in paper form has been increasing. The digitization of a document referred to herein does not only refer to reading a document on paper with a device such as a scanner and obtaining image data. For example, in document digitization processing, image data is separated into distinct areas that constitute a document, such as character areas, graphic areas, photograph areas, and table areas. These areas are then converted into data in respective optimal formats, such as character code for the character areas, vector data for the graphic areas, bitmap data for the background areas and photograph areas, and structured data for the table areas.

As a technique of conversion into vector data, Japanese Patent Laid-Open No. 2007-158725 discloses an image processing apparatus. This image processing apparatus divides image data into areas, extracts the outline of each area, and converts the extracted outline into vector data. The area division method used in this image processing apparatus will be described below.

First, image data is divided into areas by Nearest Neighbor clustering. Nearest Neighbor clustering searches for a cluster such that the distance to a feature vector of a processing-target sample (e.g. RGB values of a target pixel) is the shortest. If the shortest distance is below a predetermined threshold, the processing-target sample is assigned to the cluster. Otherwise, a new cluster is defined to assign the processing-target sample to the newly defined cluster. In the clustering processing for image data, color information (pixel values of R, G, and B) is generally used as a feature vector. The centroid of a cluster, i.e., the average of feature vectors (color information) of all samples (i.e., all sampled pixels) belonging to the cluster, is generally used as a representative feature vector of the cluster.

Integration processing is then performed for the areas divided by Nearest Neighbor clustering. In this processing, a target value for the number of areas (the target number of clusters) is set, and clusters are integrated until the number of clusters fall within the target value. Specifically, distances between the feature vectors of the clusters are calculated, and two clusters with the shortest distance between them are integrated into one cluster.

The clustering processing can also be applied to applications other than image data. For example, the clustering processing can be applied to data mining, such as discovering groups of users or customers having the same tendencies from a database of a Web access history or from a database of a sales history in a POS (Point of Sales) system by sorting data into groups with similar characteristics.

In assigning data to clusters through the clustering processing, the computation time increases according to the number of clusters. This is because the number of times the distance between feature vectors is calculated increases with the increase of the number of clusters in both the Nearest Neighbor clustering processing and the cluster integration processing.

As a conventional technique for solving the above inconvenience, Japanese Patent Laid-Open No. 8-30787 discloses an image area dividing method and an image area integrating method. In this conventional technique, image data is divided into rectangles and each rectangle is divided into areas through the clustering processing. In order to prevent unnatural area division at the boundaries of the rectangles, the clustering processing is performed twice or more around the boundaries of the rectangles, and then integration processing is performed. According to this conventional technique, performing the clustering processing in parallel for each rectangle enables faster area division.

Besides image data, the clustering processing is applied to other forms of data in order to group similar data together for purposes such as data analysis.

However, in the parallel processing according to the conventional technique, the clustering processing is performed for each divided rectangle and therefore the number of clusters increases according to the number of divided rectangles. Further, in the conventional technique, the cluster integration processing is performed after the clustering processing is all finished. The more times the data is divided for the clustering processing, the more clusters to be subjected to the integration processing are generated. This disadvantageously causes the increase of the processing time required for the cluster integration processing.

SUMMARY OF THE INVENTION

The present invention provides a clustering processing apparatus capable of performing fast data clustering processing.

The present invention includes the following configuration. Specifically, a clustering processing apparatus that groups data including a plurality of samples into clusters, comprises: N clustering units that group, for corresponding one of N data blocks resulting from dividing the data, samples included in the data block into clusters within the data block, each clustering unit sequentially taking each sample included in the corresponding one of the N data blocks as a focused sample (i.e., a target sample), grouping the focused sample into one of the clusters within the data block, storing, in a first storage unit, cluster information including identification information on each cluster into which the samples are grouped within the data block, and storing, in a second storage unit, sample assignment information indicating the cluster to which the focused sample belongs; a cluster information transferring unit that selects, for each of the data blocks, cluster information on a cluster to be integrated from the cluster information stored in the first storage unit when a predetermined condition is met, and transfers the selected cluster information from the first storage unit to a third storage unit; and an updating unit that integrates clusters selected based on the cluster information stored in the third storage unit into an integrated cluster and updates the sample assignment information stored in the second storage unit based on information of the integrated clusters.

According to the present invention, cluster assignment processing is performed in parallel for each of N divided data groups. Further, in parallel with the cluster assignment processing, cluster integration processing is performed. This enables clustering processing faster than in conventional approaches.

Further features of the present invention will become apparent from the following description of exemplary embodiments with reference to the attached drawings.

DESCRIPTION OF THE EMBODIMENTS

First Embodiment

Figure 1:
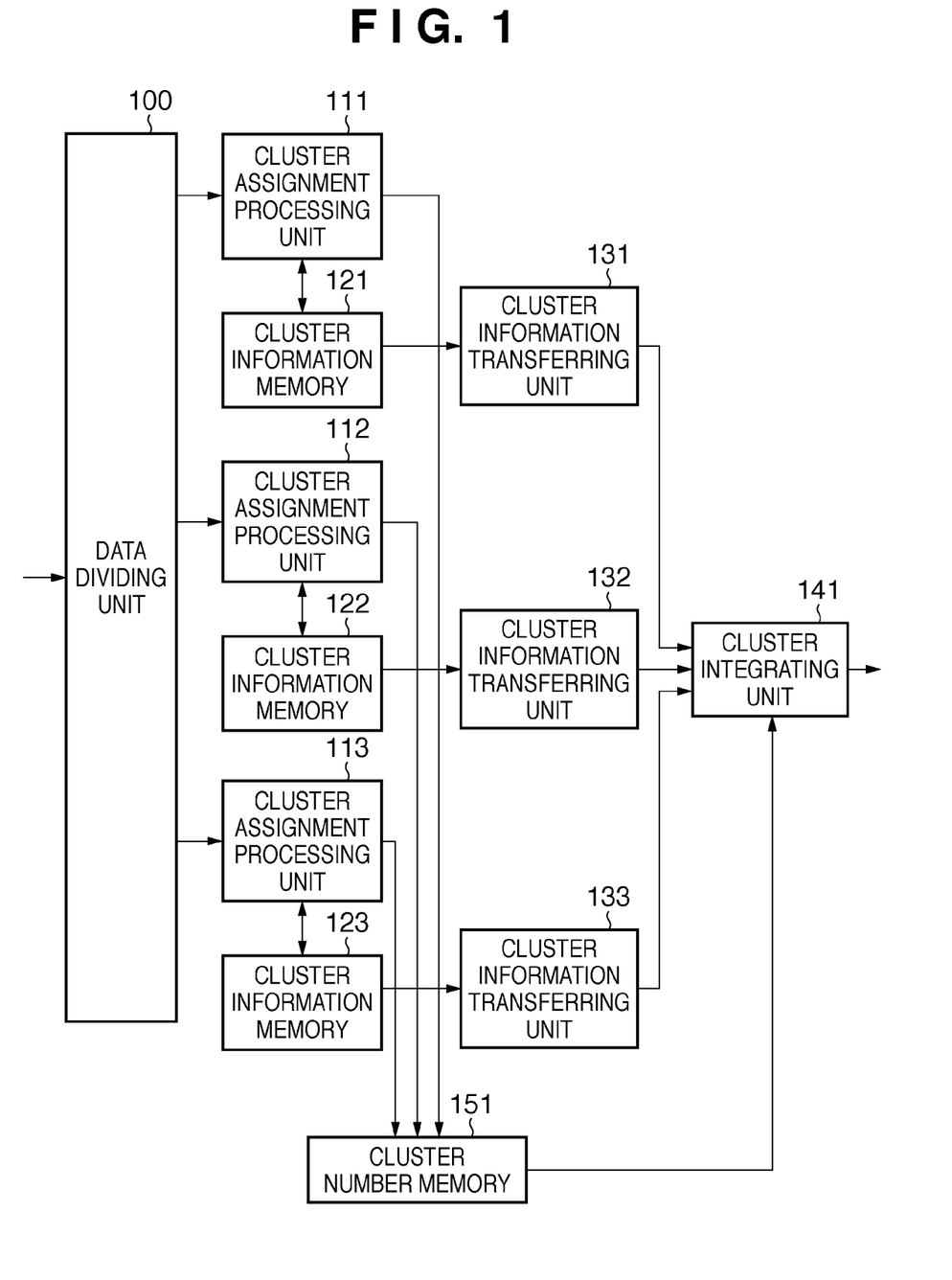
FIG. 1 is a diagram showing a configuration of a clustering apparatus in a first embodiment.

A clustering processing apparatus in a first embodiment according to the present invention will be described using FIG. 1. FIG. 1 is a diagram showing a configuration of the clustering processing apparatus in this embodiment. The clustering processing apparatus in this embodiment performs clustering processing, where each of pixels that constitute image data is a sample to be subjected to the clustering processing, and color information on each pixel is a feature vector. Here, a pixel to be subjected to the clustering processing may be referred to as a "sample". The clustering processing apparatus in this embodiment includes a data dividing unit 100, cluster assignment processing units 111 to 113, cluster information memory 121 to 123, cluster information transferring units 131 to 133, a cluster integrating unit 141, and a cluster number memory 151. The cluster information memory 121 to 123 are connected to the cluster assignment processing units 111 to 113 and the cluster information transferring units 131 to 133, respectively. Operation of the clustering processing apparatus in this embodiment will be described below with reference to FIG. 1.

Figure 12A:
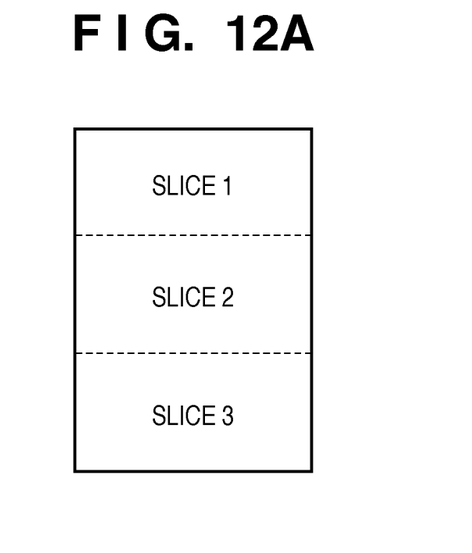
FIGS. 12A and 12B are diagrams showing examples of image division by a data dividing unit 100.
Figure 12B:
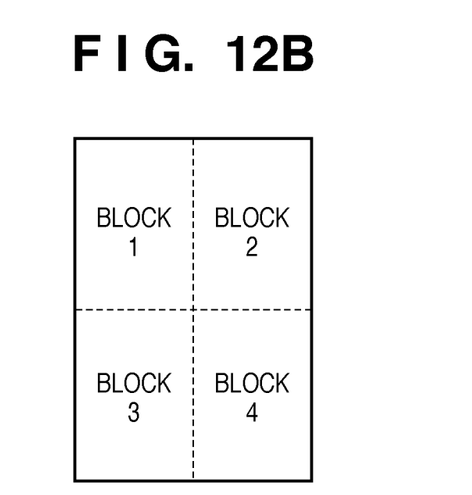

The data dividing unit 100 stores an externally input image in buffer memory (not shown), divides the image into three slices as shown in FIG. 12A, and allocates the slices to the cluster assignment processing units 111 to 113, respectively. Each slice is also referred to as a data block. Although the input image is divided into three slices in this embodiment, the present invention is not limited to this. For example, the image may be divided into four blocks as shown in FIG. 12B if there are four cluster assignment processing units.

The cluster assignment processing units 111 to 113 perform cluster assignment processing in parallel. In the cluster assignment processing, samples (i.e. pixels) in the slices 1 to 3 divided by the data dividing unit 100 are assigned to previously defined clusters or newly defined clusters, that is, the samples (the pixels) are grouped into clusters. The cluster information memory 121 to 123 are memory that store cluster information defined and updated by the cluster assignment processing units 111 to 113. The cluster information memory 121 to 123 each serve as a first storage unit. The cluster information includes a representative feature vector of each cluster, sample identification information that identifies a sample most recently assigned to each cluster, and the number of samples belonging to each cluster. The cluster information memory 121 to 123 also store the number of assignment-destination candidate clusters, which is the number of clusters potentially identified by the cluster assignment processing units 111 to 113 as a cluster to which a sample is assigned. Clusters selected by the cluster information transferring units to be described later are not included in the assignment-destination candidate clusters. Each cluster assignment processing unit may be implemented by a programmable gate array, or by memory that stores a program and a processor that executes the program, for example.

Figure 13A:
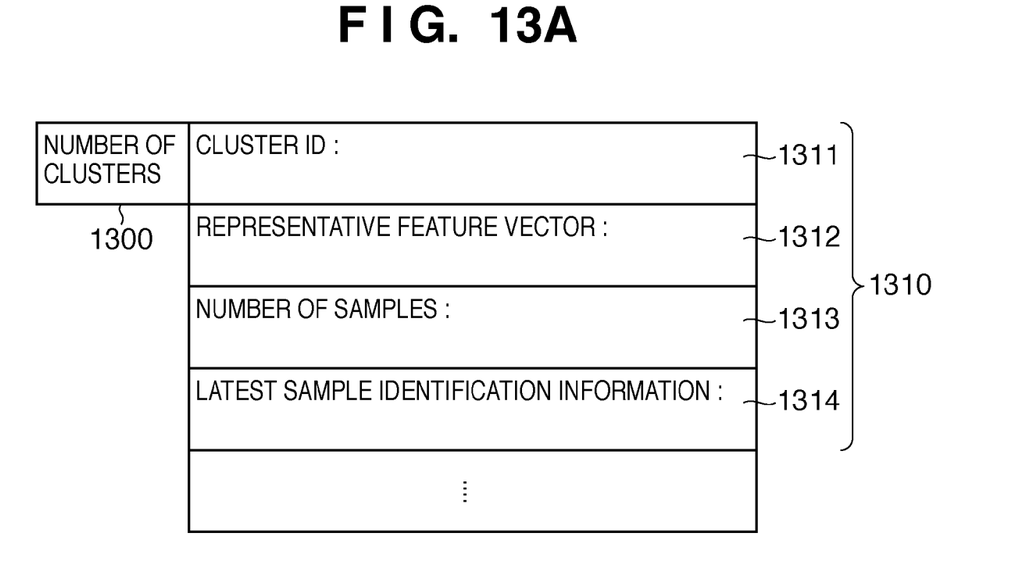
FIG. 13A is a diagram showing an example of cluster information.

FIG. 13A shows an example of the cluster information. The cluster information includes the number of clusters 1300 indicating the number of clusters in a data block in question. The number of clusters is undetermined during the process of clustering and therefore is also referred to as the number of assignment-destination candidate clusters. For each cluster, the cluster information includes a cluster ID 1311 that is cluster identification information, a representative feature vector 1312 of the cluster, the number of samples (i.e., the number of pixels) 1313 belonging to the cluster, and sample identification information 1314 that identifies the latest sample belonging to the cluster. The cluster information on a cluster herein refers to the cluster information 1310 including the cluster ID 1311, the representative feature vector 1312, the number of samples 1313, and the latest sample identification information 1314. The term "latest" may be defined with reference to the focus order in which a pixel is focused (i.e., selected as a target), for example. In this case, the address of a pixel grouped last into the cluster may be used as the sample identification information 1314 because the focus order can be uniquely known from the address. The sample identification information does not have to be an address but needs to be information that allows knowing where a sample is in the sequential order.

In this embodiment, the feature vector of a sample is color information (pixel values of R, G, and B) on a pixel. However, the present invention is not limited to this. For example, edge strength may be employed as the feature vector. The representative feature vector of a cluster is the average of feature vectors of all samples belonging to the cluster.

<Clustering Processing within a Block>

Figure 2:
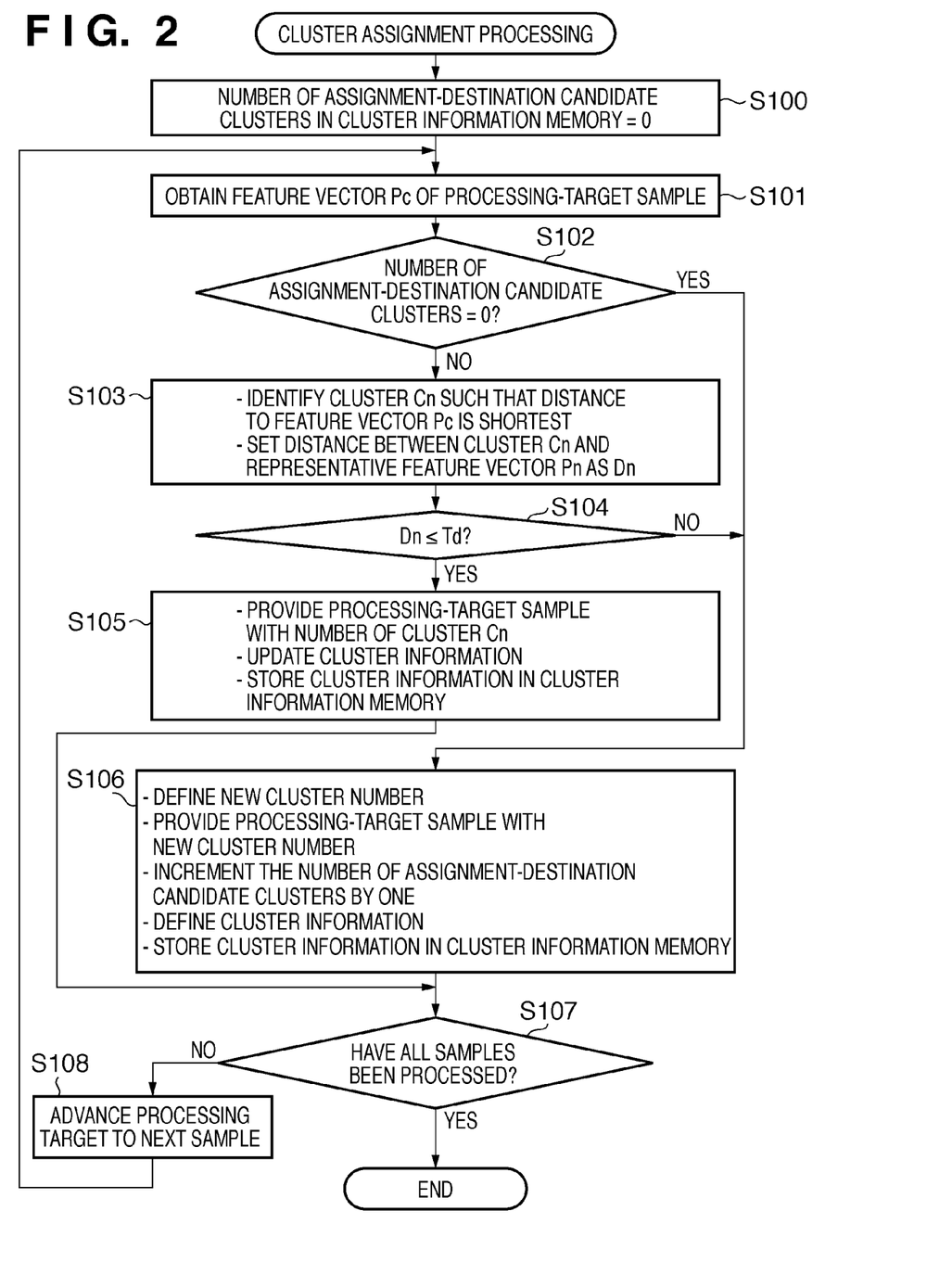
FIG. 2 is a flowchart showing operation of cluster assignment processing units 111 to 113.

With reference to FIG. 2, a process flow in the cluster assignment processing units 111 to 113 will be described below. Since all the cluster assignment processing units 111 to 113 follow the same process flow, the reference numerals for the cluster assignment processing units and the cluster information memory will be omitted.

First, in step S100, the number of assignment-destination candidate clusters (i.e., the number of clusters 1300) stored in the cluster information memory is initialized to 0.

A first processing-target sample (e.g. a first target pixel) is focused (i.e., taken as a target), and a feature vector Pc of the target sample (e.g. RGB value of the target pixel) is obtained (step S101). It is determined whether or not the number of assignment-destination candidate clusters stored in the cluster information memory is 0 (step S102). If the number of assignment-destination candidate clusters is (YES in step S102), the process proceeds to step S106. Otherwise (NO in step S102), the process proceeds to step S103.

In step S103, with reference to the existing cluster information stored in the cluster information memory, a cluster Cn is identified such that the distance between the feature vector Pc of the processing-target sample and the representative feature vector is the shortest. The shortest distance is set as Dn. That is, the distance between the feature vector Pc of the processing-target sample and the representative feature vector of each of all the assignment-destination candidate clusters stored in the cluster information memory is calculated, and a cluster with the shortest distance is selected among the assignment-destination candidate clusters.

In step S104, it is determined whether or not the shortest distance Dn is below a threshold (a distance threshold) Td. If the shortest distance Dn is below the distance threshold Td (YES in step S104), the process proceeds to step S105. Otherwise (NO in step S104), the process proceeds to step S106.

Figure 13B:
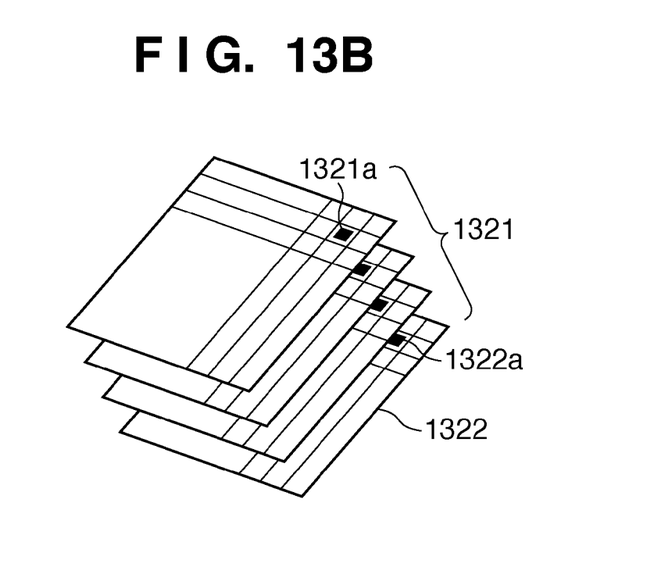
FIG. 13B is a diagram showing an example of sample assignment information.

In step S105, processing of assigning the processing-target sample to the cluster Cn is performed. That is, the focused processing-target sample (i.e. the focused target pixel) is grouped as a sample that belongs to the cluster Cn. Specifically, the processing-target sample is provided with a cluster number of the cluster Cn. The cluster number provided here is a provisional cluster number (hereinafter referred to as a provisional cluster number) because of the possibility of being updated by the cluster integrating unit 141 to be described later. The provisional cluster number is output to the cluster number memory 151 and stored therein as sample assignment information. The cluster number memory 151 serves as a second storage unit. FIG. 13B shows an example of the sample assignment information 1322 indicating a cluster to which a focused target sample belongs. In this example, a provisional cluster number 1322a is stored at a location corresponding to the location of a pixel 1321a in image data 1321. That is, the order of storing provisional cluster numbers indicates correspondences to the samples. FIG. 13B illustrates the pixels as color image data of three colors. It is to be understood that other formats may be employed as long as a corresponding sample can be identified.

The cluster information 1310 on the cluster Cn is then updated and stored in the cluster information memory. Specifically, the representative feature vector Pn of the cluster Cn (the average of feature vectors of all samples belonging to the cluster Cn) is updated based on the representative feature vector Pn 1312, the number of samples 1313 belonging to the cluster Cn, and the feature vector of the processing-target sample just grouped into the cluster Cn. Further, the sample identification information 1314 that identifies the most recently grouped sample among the samples belonging to the cluster Cn is updated with identification information on the processing-target sample. In addition, the number of samples belonging to the cluster Cn is incremented by one. Upon completion of the processing in step S105, the process proceeds to step S107.

In step S106, a new cluster is defined, and the number of assignment-destination candidate clusters stored in the cluster information memory is incremented by one. Also, the cluster information on the new cluster is defined. To define the new cluster is to assign unique cluster identification information to the new cluster and to secure a cluster information area for the new cluster in the cluster information memory. In order to avoid an overlap of the cluster identification information between blocks, the cluster identification information is represented as a combination of block identification information unique to the block and cluster identification information unique within the block, for example. To define the cluster information is to store the cluster identification information on the new cluster in the cluster ID 1311 of the secured cluster information and to store the representative feature vector of the new cluster as the feature vector Pc of the processing-target sample. Further, information that identifies the processing-target sample is stored as the sample identification information 1314, and the number of samples belonging to the new cluster 1313 is set to 1. The above processing is also collectively referred to as the generation of a new cluster. The processing-target sample is provided with the identification information on the new cluster. That is, the cluster identification information on the cluster into which the processing-target sample has been just grouped is stored in the sample assignment information 1322. Upon completion of the above processing, the process proceeds to step S107.

In step S107, it is determined whether or not all the samples in the slice allocated to the cluster assignment processing unit have been processed. If not all the samples have been processed (NO in step S107), the process proceeds to step S108 for processing a next sample. Otherwise (YES in step S107), the process terminates. In step S108, a sample following the current focused processing-target sample is sequentially taken as a processing-target sample. An exemplary focus order is the raster order. An image has a spatial locality such that pixels in a certain local area are similar in color. With regard to this characteristic, for image data, it is preferable that areas around the boundary of the block be processed earlier. This is because clusters that include samples around the boundary are possibly selected for integration when clusters are to be integrated during the process of clustering. Therefore, for image data, the samples may be taken as a target in an order in which the image data is spirally scanned inward from the periphery, for example. Another exemplary way is what is called zigzag scan. Since the pixels of the image data have addresses, the next processing-target sample can be taken as a target in S108 by obtaining the address of a pixel to be processed next according to the scan order.

<Transferring Cluster Information to Cluster Integrating Unit>

Figure 3:
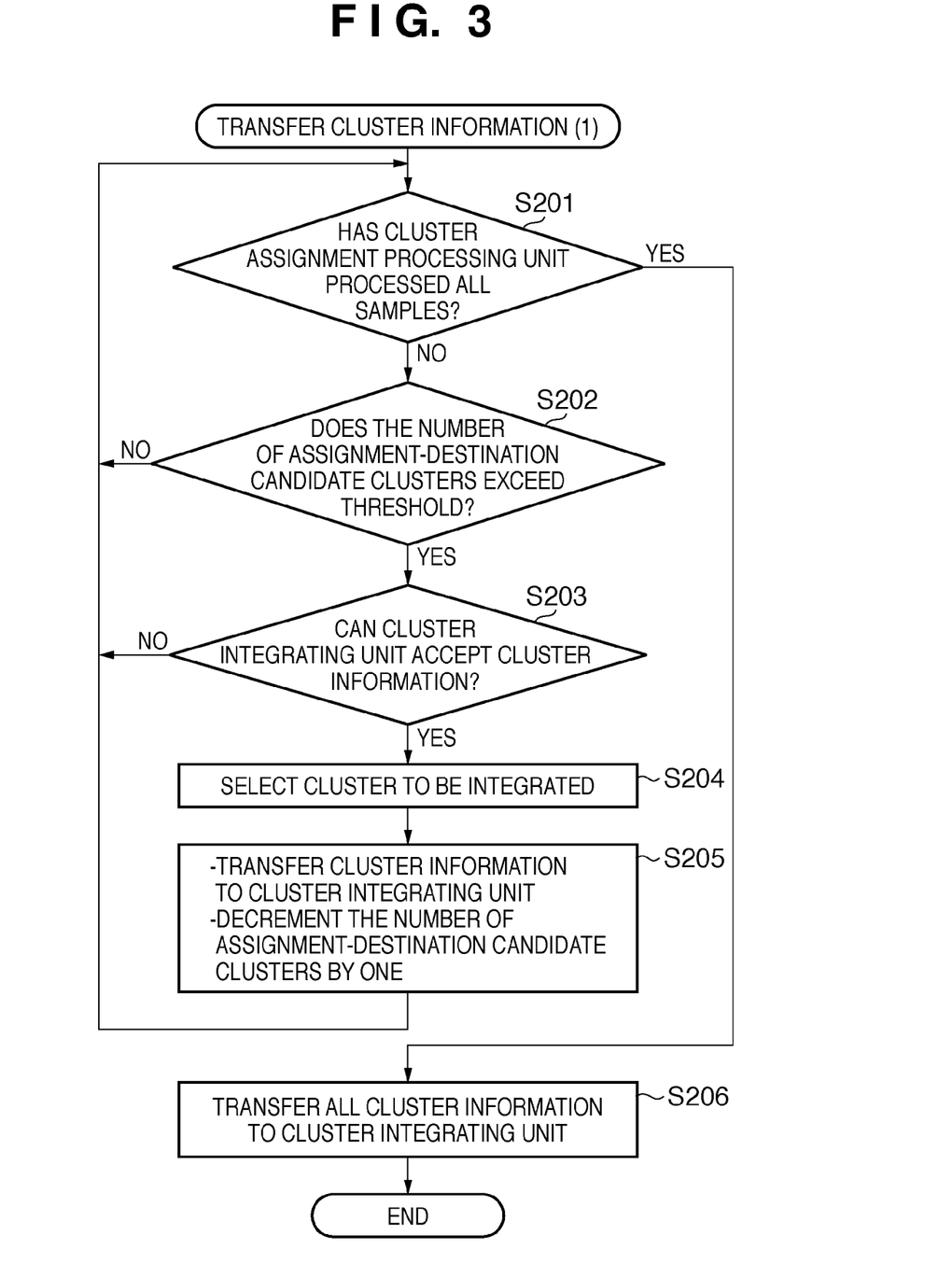
FIG. 3 is a flowchart showing operation of cluster information transferring units 131 to 133.

Next, operation of the cluster information transferring units 131 to 133 will be described using FIG. 3. FIG. 3 is a flowchart showing the operation of the cluster information transferring units 131 to 133. Since all the cluster information transferring units 131 to 133 follow the same process flow, their reference numerals will be omitted.

First, in step S201, it is determined whether or not the corresponding cluster assignment processing unit has processed all the samples in the allocated slice. If all the samples have been processed (YES in step S201), the process proceeds to step S206. Otherwise (NO in step S201), the process proceeds to step S202.

In step S202, the cluster information transferring unit refers to the cluster information memory connected thereto and determines whether or not the number of assignment-destination candidate clusters exceeds an externally set threshold (a threshold for the number of assignment-destination candidate clusters). If the number of assignment-destination candidate clusters exceeds the threshold for the number of assignment-destination candidate clusters (YES in step S202), the process proceeds to step S203. Otherwise (NO in step S202), the process returns to step S201.

In step S203, it is determined whether or not the cluster integrating unit 141 to be described later can accept the cluster information. If the cluster integrating unit 141 can accept the cluster information (YES in step S203), the process proceeds to step S204. Otherwise (NO in step S203), the process returns to step S201. The cluster information can be accepted if a buffer or a queue of the cluster integrating unit has a free space, for example.

In step S204, a cluster to be subjected to the cluster integration processing by the cluster integrating unit 141 is selected based on the cluster information. In this embodiment, the cluster information transferring unit selects a cluster such that the sample most recently assigned thereto is a sample processed earliest in the cluster assignment processing. That is, a cluster such that a sample identified from the sample identification information 1314 stored in the cluster information memory has been assigned (i.e., grouped) earliest in steps S105 and S106 in FIG. 2 is identified. The identified cluster is selected as a cluster to be integrated. Since the samples are sequentially taken as a target within the block, a sample grouped earliest can be determined based on the addresses of the samples and the scan order. For example, in the case of the raster order, the samples are taken as a target in the order of address. Accordingly, if the sample identification information is represented as addresses, a cluster to be integrated can be determined by simply comparing the addresses. Even if any other scan order is employed, a cluster to be integrated can be similarly determined by comparing the addresses of the samples according to a rule that determines the scan order.

The way of selecting the cluster to be subjected to the cluster integration processing in the present invention is not limited to the above. In another embodiment, a cluster with the fewest samples belonging thereto may be selected. In this case, the sample identification information in the cluster information is not necessary, so that the cluster assignment processing unit does not need to generate the sample identification information. Alternatively, a cluster to which a sample around the boundary of the block belongs may be selected. In this case, however, the cluster cannot be selected based on the latest sample identification information. It is then necessary to store, as block information, identification information on clusters into which a sample around the boundary of the block has been grouped.

In step S205, the cluster information on the selected cluster to be integrated is transferred to the cluster integrating unit 141. That is, the cluster information 1310 to be transferred is passed to the cluster integrating unit 141 and deleted from the cluster information memory. Also, the number of assignment-destination candidate clusters 1300 stored in the cluster information memory is decremented by one. Thereafter, the cluster information on the cluster selected by the cluster information transferring unit will not be referred to in the processing in step S103 (FIG. 2) of the cluster assignment processing unit. Nor will a cluster with the same identification information as the selected cluster be newly generated. That is, since the cluster selected by the cluster information transferring unit will not be identified as a cluster assignment-destination candidate in step S103, the selected cluster will be excluded in the processing of calculating the distance between the processing-target sample and the representative feature vector.

In step S206, the cluster assignment processing unit has processed all the samples in the allocated slice, so that all the cluster information is transferred to the cluster integrating unit 141.

<Cluster Integration Processing>

Figure 7:
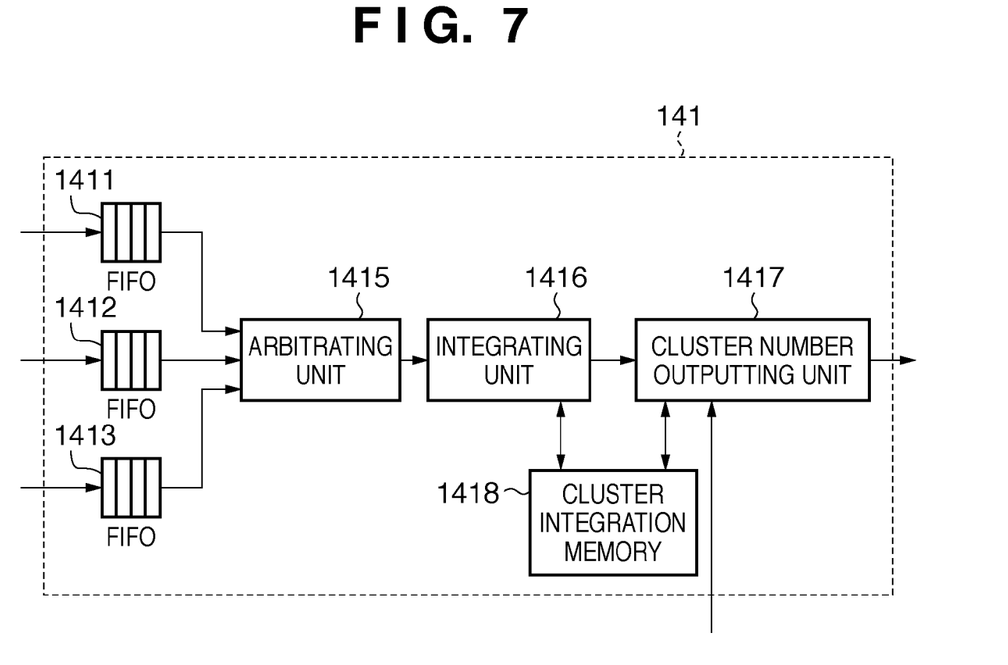
FIG. 7 is a block diagram showing a detailed configuration of a cluster integrating unit 141.

Next, the cluster integrating unit 141 will be described. The cluster integrating unit 141 receives the cluster information transferred from each of the cluster information transferring units 131 to 133. If clusters corresponding to the received cluster information meet a predetermined integration condition, the cluster integrating unit 141 integrates the clusters together. FIG. 7 is a block diagram showing a detailed configuration of the cluster integrating unit 141. The cluster integrating unit 141 includes FIFOs 1411 to 1413, an arbitrating unit 1415, an integrating unit 1416, a cluster number outputting unit 1417, and a cluster integration memory 1418. The FIFOs 1411 to 1413 are connected to the cluster information transferring units 131 to 133 in FIG. 1, respectively. The cluster number outputting unit 1417 is connected to the cluster number memory 151 in FIG. 1. Operation of the cluster integrating unit 141 will be described below with reference to FIG. 7.

The FIFOs 1411 to 1413 are FIFOs that receive the cluster information transferred from the cluster information transferring units 131 to 133, respectively. The FIFOs 1411 to 1413 each serve as a third storage unit. When the FIFOs 1411 to 1413 are full of data, the FIFOs 1411 to 1413 output a signal to the cluster information transferring units 131 to 133 indicating that the cluster information cannot be accepted.

The arbitrating unit 1415 takes the cluster information from the FIFOs 1411 to 1413 and outputs the cluster information to the integrating unit 1416. Although the way of selecting a FIFO from which the cluster information is taken is not limited in the present invention, a typical way is round-robin selection. This embodiment employs round-robin selection.

The integrating unit 1416 receives the cluster information output from the arbitrating unit 1415 and temporarily stores the cluster information in the cluster integration memory 1418. When the cluster integration condition is met, the integrating unit 1416 performs the cluster integration processing. Specifically, two clusters with the shortest distance between their representative feature vectors are identified with reference to the cluster integration memory 1418 and integrated together. Cluster information on the resultant integrated cluster is generated and stored in the cluster integration memory 1418. The cluster information after the integration is provided with new unique cluster identification information. Since no further samples will be assigned to the integrated cluster in this embodiment, no other information needs to be generated. However, if the integrated cluster will be used to group samples, it is necessary to generate the representative feature vector, the number of samples, and the latest sample identification information for the integrated cluster. The representative feature vector is a weighted average of the representative feature vectors of the clusters before the integration weighted with the numbers of samples. The number of samples is the sum of the numbers of samples of the clusters before the integration. The sample identification information is the oldest sample identification information selected from the sample identification information on the clusters before the integration. Further, a cluster number matching list is generated and stored in the cluster integration memory 1418. The cluster number matching list indicates the correspondence between the provisional cluster number provided to each sample by the cluster assignment processing units 111 to 113 and the cluster number after the integration.

By way of example, the cluster integration condition may be that the number of pieces of cluster information stored in the cluster integration memory 1418 exceeds an externally set threshold. Alternatively, the cluster integration processing may be performed at any time irrespective of the number of pieces of cluster information on condition that the distance between the representative feature vectors of clusters is not above a predetermined value.

After the cluster assignment processing units 111 to 113 have processed all the samples, and the cluster information transferring units 131 to 133 have output all the cluster information, and the integrating unit 1416 has finished its processing, the cluster number outputting unit 1417 outputs the cluster information and the cluster number of each sample. Specifically, the cluster number outputting unit 1417 sequentially reads the provisional cluster number of each sample from the cluster number memory 151. With reference to the cluster number matching list stored in the cluster integration memory 1418, if the cluster indicated by the provisional cluster number has been integrated, the cluster number is rewritten to the cluster number after the integration and output to the outside. Otherwise, the provisional cluster number is output to the outside as it is. The output cluster number associated with each sample is, for example, stored and referred to for image processing.

Thus, as described above, in the clustering processing apparatus in this embodiment, the cluster assignment processing units 111 to 113 each perform the clustering processing in parallel for the image divided by the data dividing unit 100. This enables a speedup in the clustering processing according to the number of divided data blocks, compared with the case of an undivided image.

Further, the cluster information transferring units 131 to 133 select clusters to be integrated, which are then integrated by the cluster integrating unit 141 at any time. This enables fast processing compared with a case where clusters are integrated after the cluster assignment processing units 111 to 113 each finish the cluster assignment processing for all the samples in the allocated slice.

In addition, the cluster information on the clusters selected by the cluster information transferring units 131 to 133 to be integrated is transferred from the corresponding cluster information memory to the cluster integrating unit 141. Therefore the cluster information will not be referred to by the cluster assignment processing units 111 to 113. This reduces the load imposed in the processing of searching for a cluster with the shortest distance to the representative feature vector by the cluster assignment processing units 111 to 113, thereby enabling fast clustering processing.

Variations of First Embodiment

Figure 4:
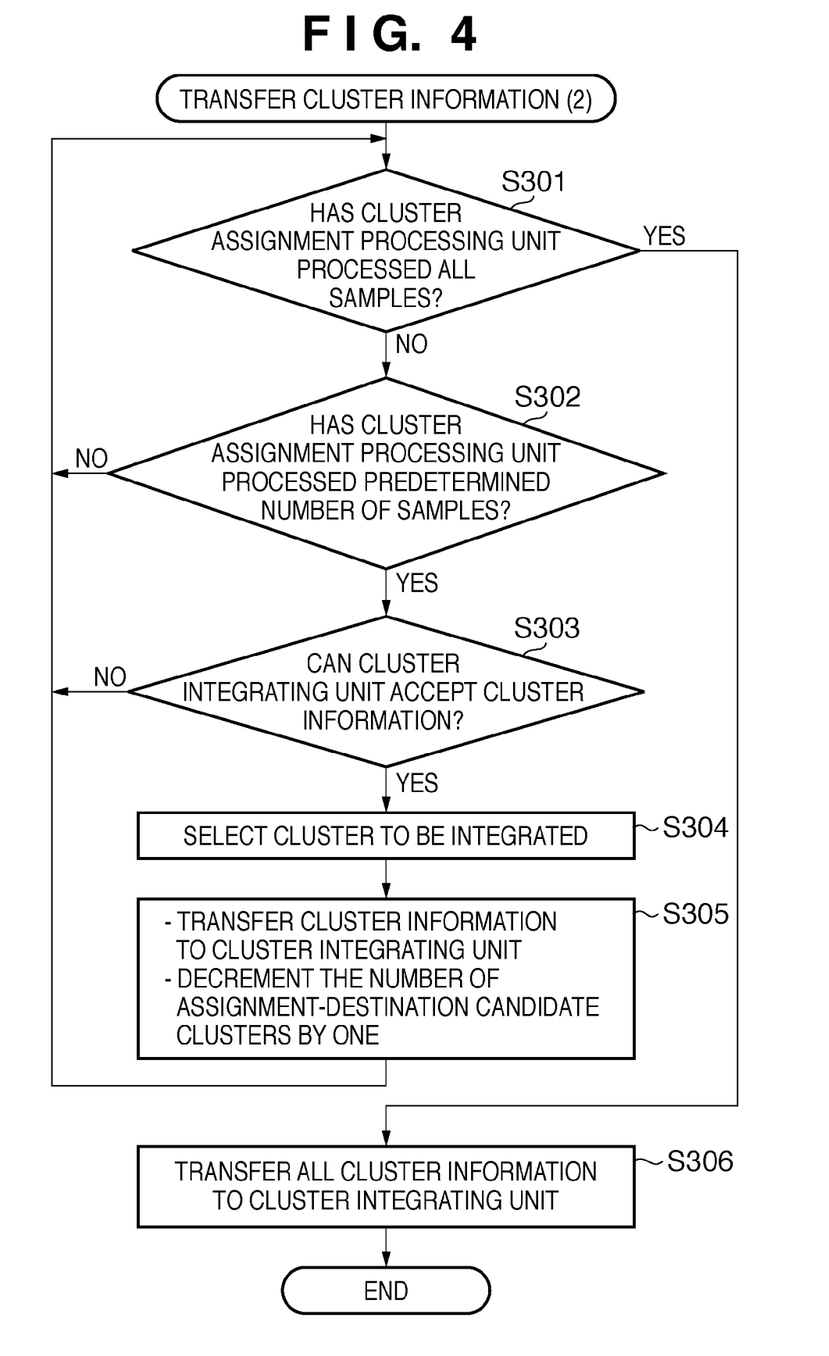
FIG. 4 is a flowchart showing operation of the cluster information transferring units in another embodiment.

In the first embodiment, the cluster information transferring unit selects a cluster to be integrated when it is determined that the number of assignment-destination candidate clusters exceeds the threshold for the number of assignment-destination candidate clusters (YES in step S202). However, the present invention is not limited to this. As shown in step S302 in FIG. 4, a cluster to be integrated may be selected every time the cluster assignment processing unit processes a predetermined number of samples. For example, in the case of clustering image data, a cluster to be integrated may be selected every time the cluster assignment processing unit processes one or two lines. In this case, the number of samples processed by the cluster assignment processing unit is stored in the cluster information memory. Based on the number of processed samples, the cluster information transferring unit makes the determination in step S302.

Figure 5:
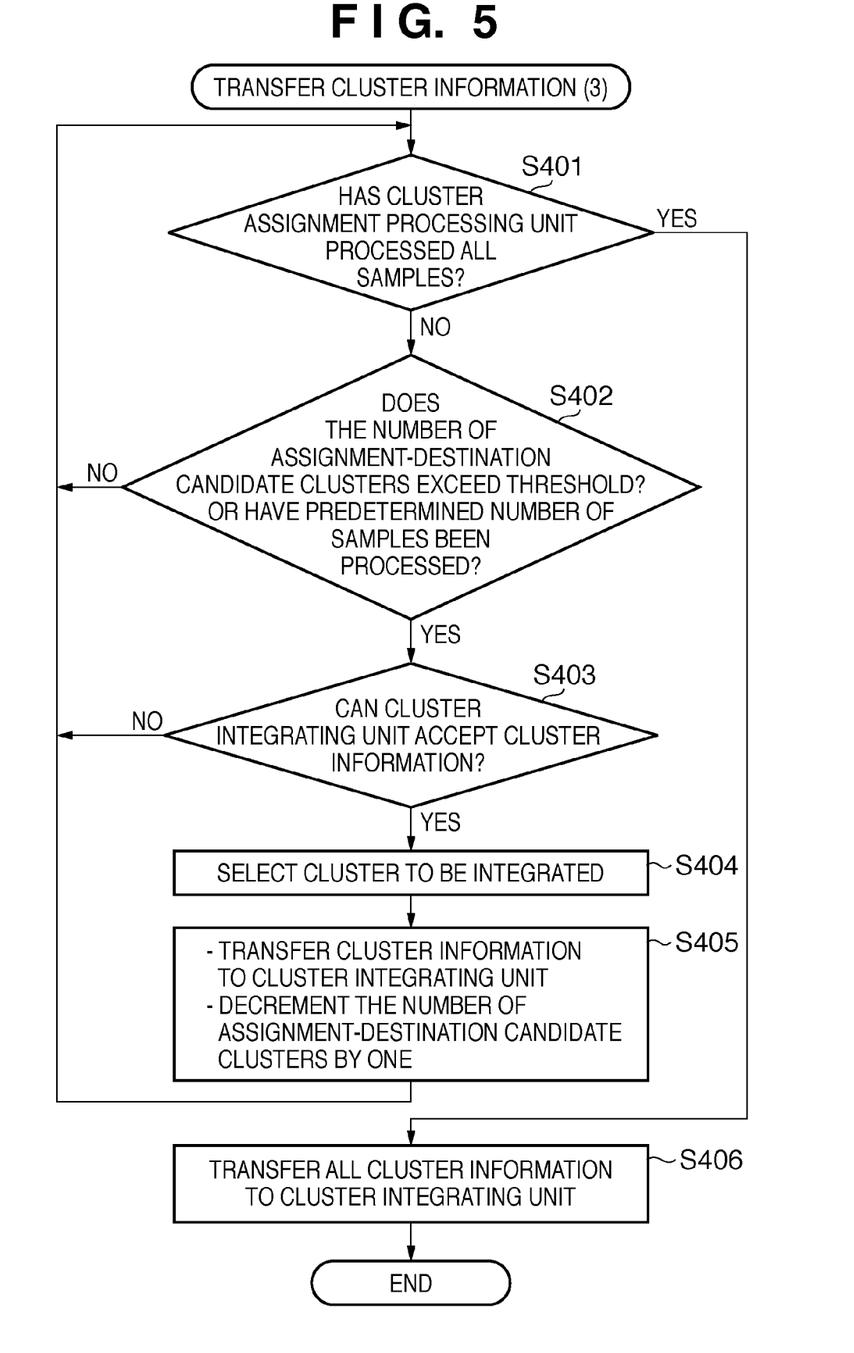
FIG. 5 is a flowchart showing operation of the cluster information transferring units in another embodiment.

In still another embodiment, as shown in step S402 in FIG. 5, a cluster to be integrated may be selected either when the cluster assignment processing unit processes a predetermined number of samples or when the number of clusters exceeds the threshold for the number of clusters.

Figure 6:
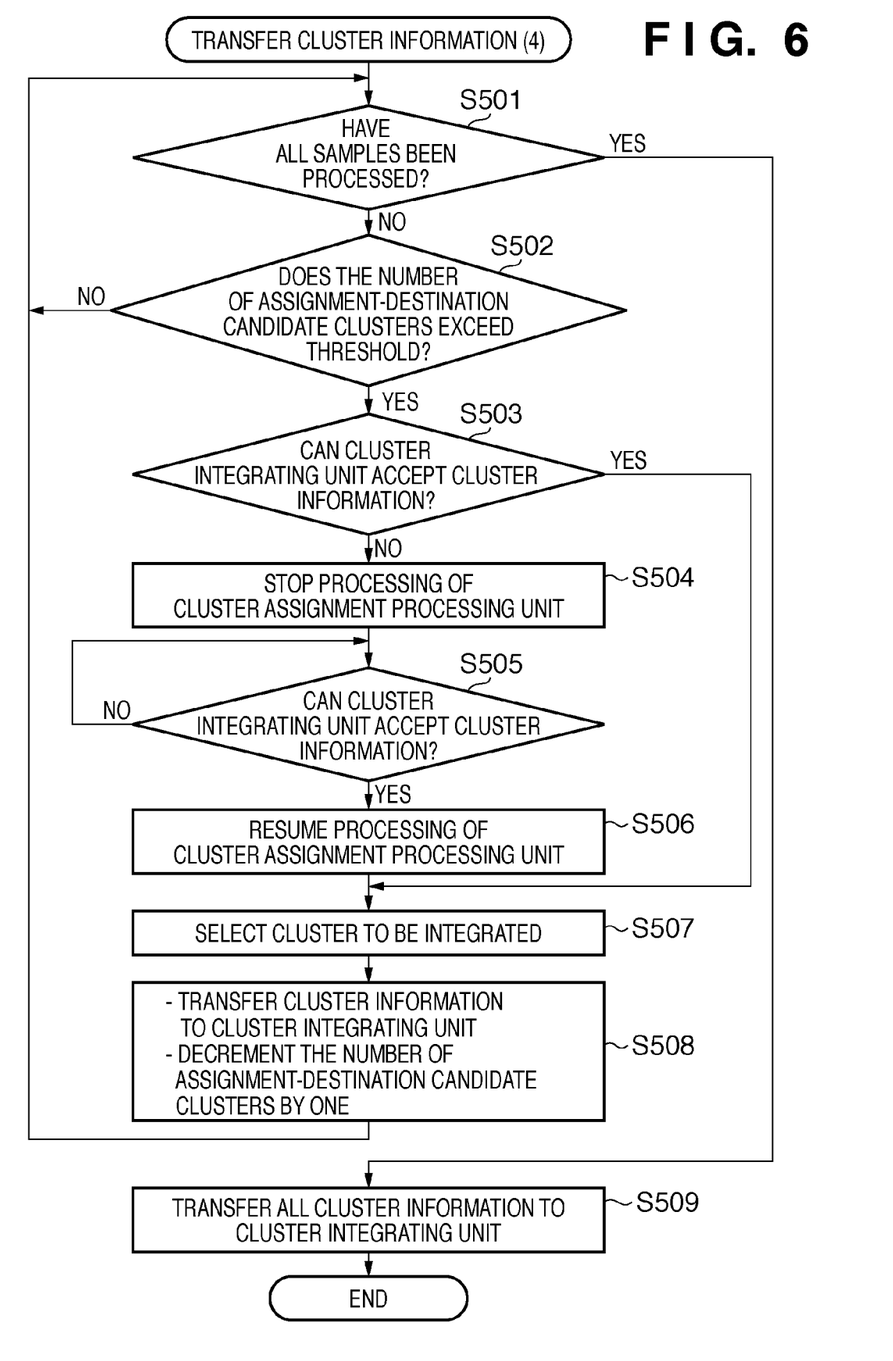
FIG. 6 is a flowchart showing operation of the cluster information transferring units in another embodiment.

Further, in the first embodiment, the process returns to step S201 if the cluster integrating unit 141 cannot accept the cluster information (NO in step S203). However, the present invention is not limited to this. For example, as shown in steps S503 to S506 in FIG. 6, if the cluster integrating unit 141 cannot accept the cluster information (NO in step S503), the processing of the cluster assignment processing unit may be stopped (step S504). When the cluster integrating unit 141 becomes able to accept the cluster information (YES in step S505), the processing of the cluster assignment processing unit is resumed (step S506). Here, when the cluster integrating unit 141 cannot accept the cluster information is when the FIFOs 1411 to 1413 (FIG. 7) are full of data, as described above. In other words, it is when the number of clusters yet to be processed by the cluster integrating unit 141 exceeds a threshold for the number of clusters waiting for the integration processing (in this embodiment, the number of FIFO stages).

Figure 8:
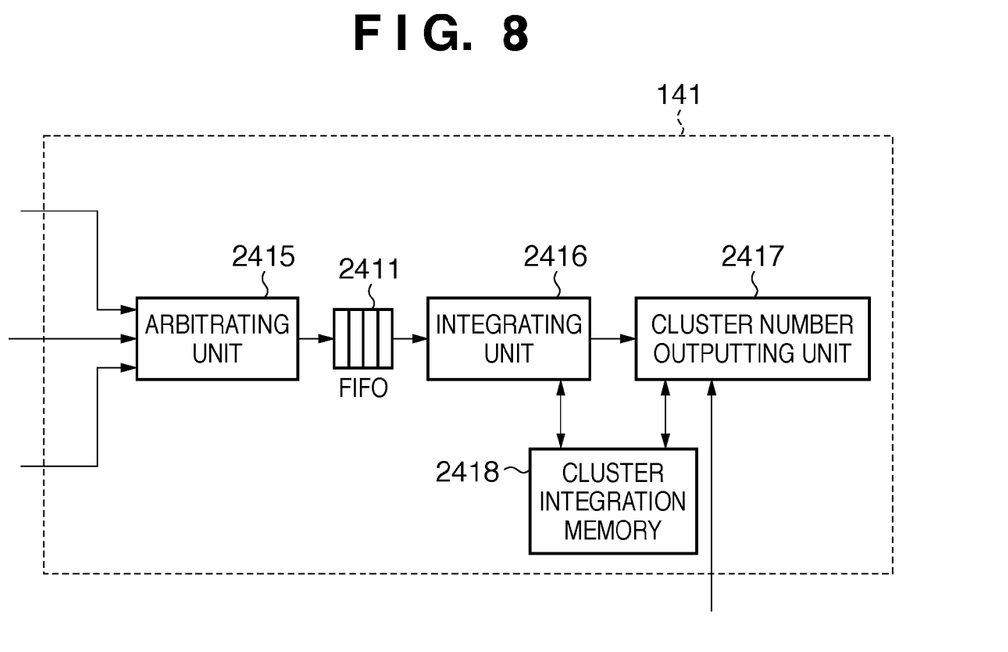
FIG. 8 is a block diagram showing a configuration of the cluster integrating unit in another embodiment.
Figure 9:
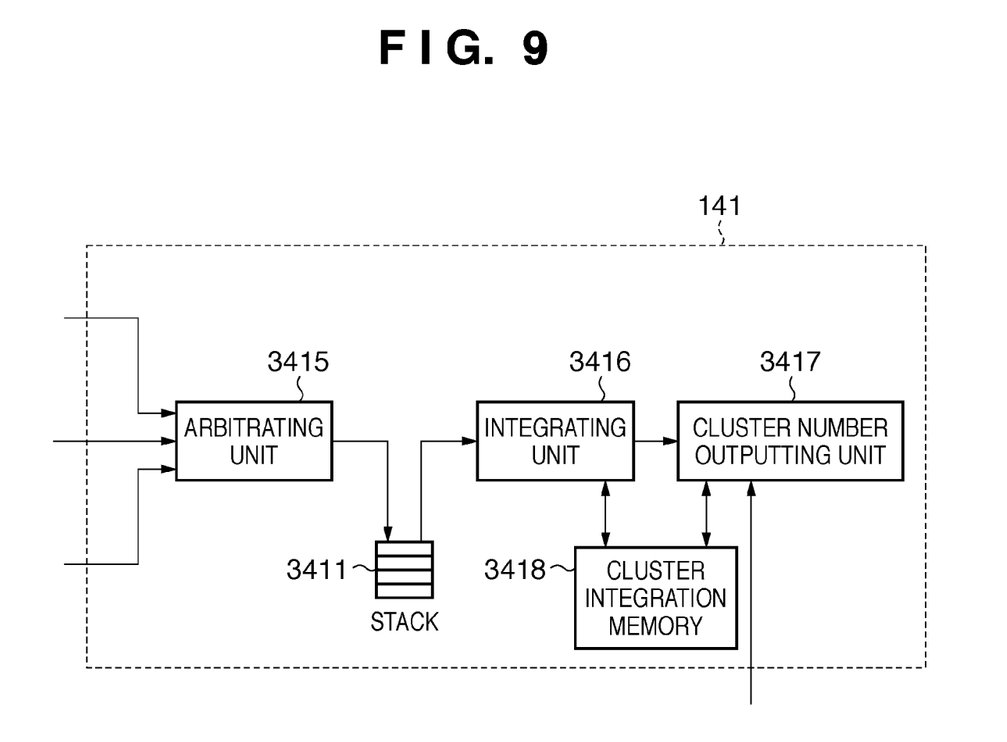
FIG. 9 is a block diagram showing a configuration of the cluster integrating unit in another embodiment.

Further, although the cluster integrating unit 141 in the first embodiment includes the three FIFOs as shown in FIG. 7, the present invention is not limited to this. For example, as shown in FIG. 8, an arbitrating unit 2415 may receive the cluster information from the cluster information transferring units 131 to 133 and output the cluster information to a FIFO 2411, from which an integrating unit 2416 may take the cluster information. Alternatively, as shown in FIG. 9, the cluster information may be output to a stack 3411.

Figure 10:
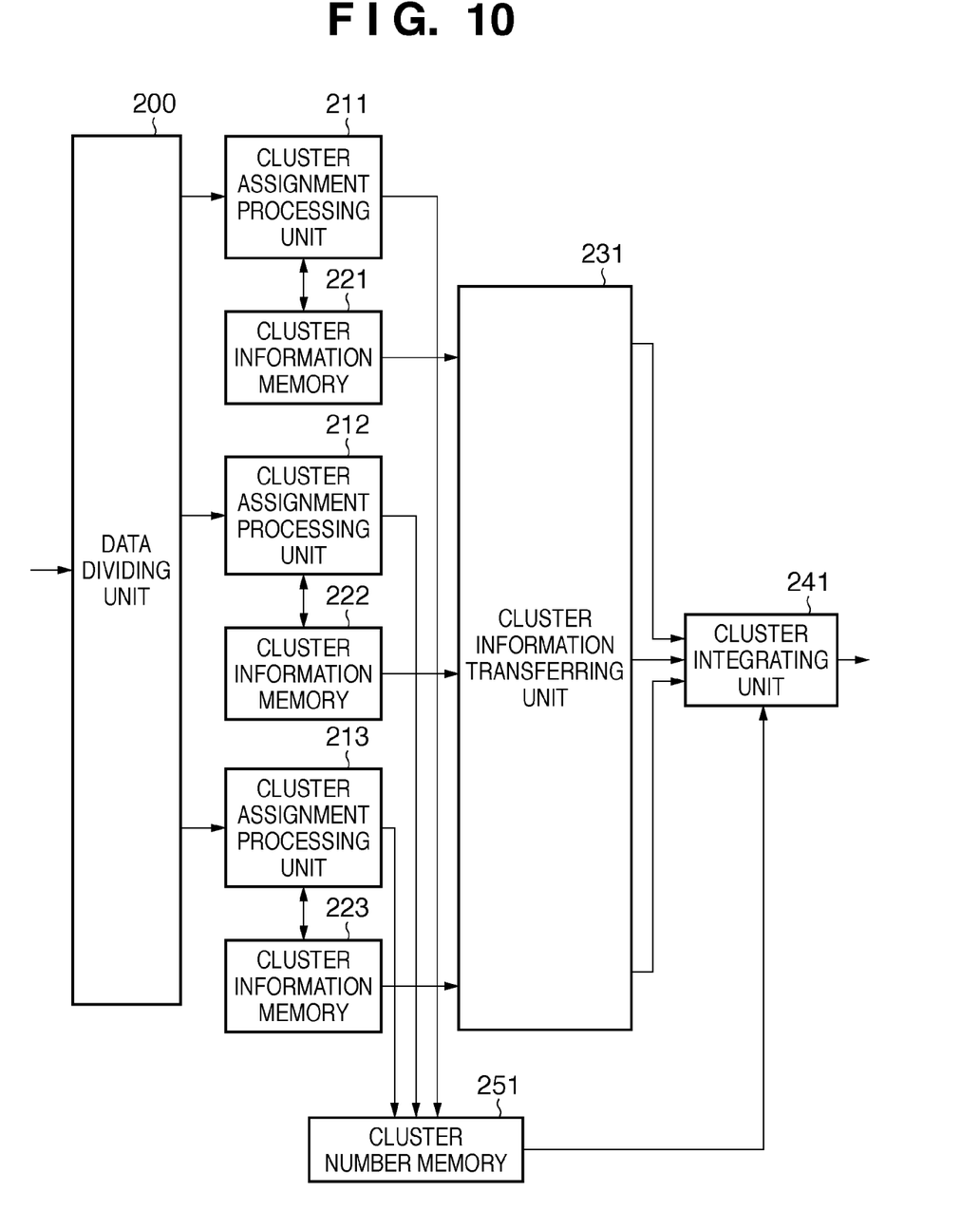
FIG. 10 is a block diagram showing a configuration of the clustering apparatus in another embodiment.

In the first embodiment, as shown in FIG. 1, the cluster information transferring units 131 to 133 corresponding to the respective cluster assignment processing units 111 to 113 are provided. However, as shown in FIG. 10, a single cluster information transferring unit may be provided. In this case, a cluster information transferring unit 231 may refer to cluster information memory 221 to 223 one by one to select clusters to be integrated. Also, in the first embodiment, the data to be processed is divided into three data blocks, for each of which the clustering processing is performed. However, rather than three data blocks, the data dividing unit 100 may divide the data into N data blocks, for each of which the clustering processing may be performed. In this case, the same number of, i.e., N cluster assignment processing units, cluster information memory, and cluster information transferring units as the number of data blocks are required.

Although the clustering processing apparatus in the first embodiment processes image data, the present invention is not limited to this. As described in the Background of the Invention, in applications such as analyzing a Web accesses history or analyzing sales in a POS system, the present invention may be applied to clustering processing where URLs or commodities are samples.

Second Embodiment

Figure 11:
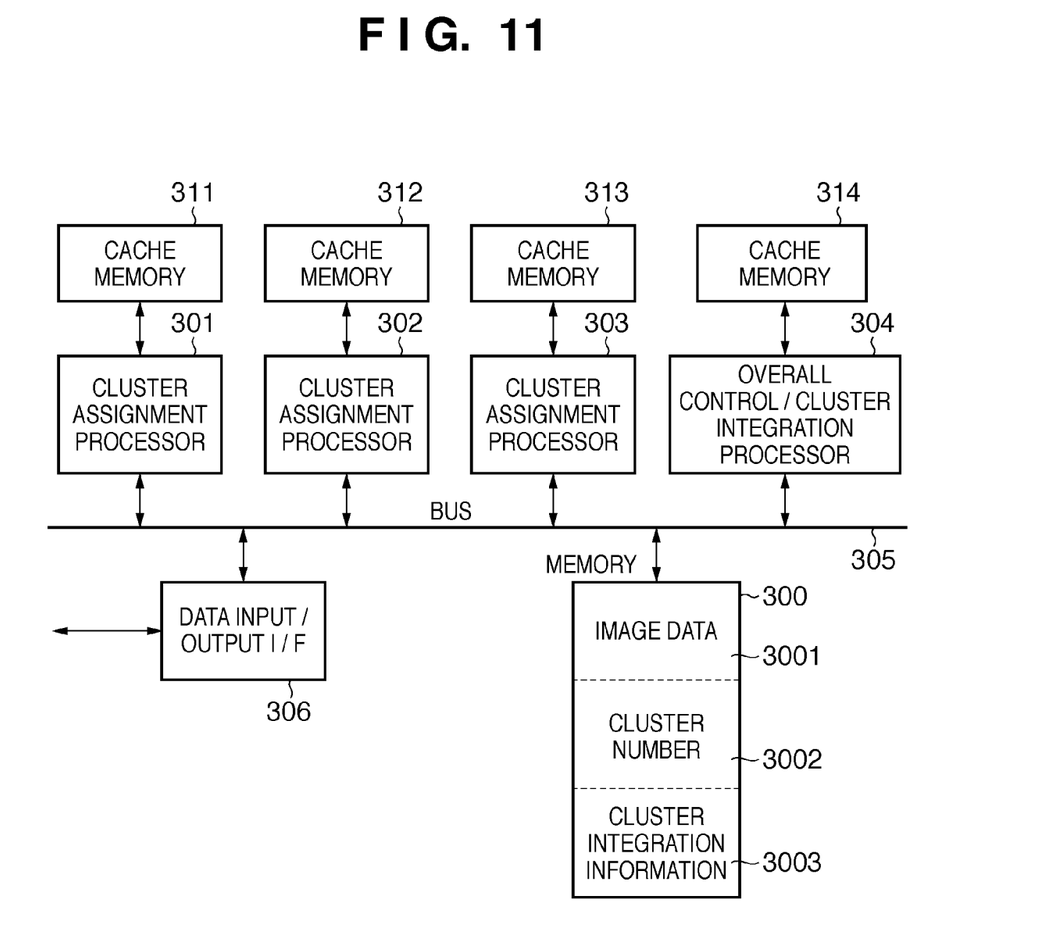
FIG. 11 is a block diagram showing a configuration of a clustering apparatus in a second embodiment.

A clustering processing apparatus in a second embodiment according to the present invention will be described using FIG. 11. FIG. 11 is a diagram showing a configuration of the clustering processing apparatus in this embodiment. The clustering processing apparatus in this embodiment includes a memory 300, cluster assignment processors 301 to 303, an overall control/cluster integration processor 304, cache memory 311 to 314, a bus 305, and a data input/output I/F 306. Each processor may be an independent computer. The cluster assignment processors 301 to 303, the overall control/cluster integration processor 304, the memory 300, and the data input/output I/F 306 are interconnected via the bus 305. The cache memory 311 to 313 are attached to the cluster assignment processors 301 to 303, respectively, and the cache memory 314 is attached to the overall control/cluster integration processor 304. The clustering processing apparatus in this embodiment performs processing, where each of pixels that constitute image data is a sample to be subjected to clustering processing, and color information on each pixel is a feature vector. Operation of the clustering processing apparatus in this embodiment will be described below using FIG. 11.

The overall control/cluster integration processor 304 stores image data to be subjected to the clustering processing in an image data area 3001 in the memory 300 via the data input/output I/F 306. The overall control/cluster integration processor 304 then divides the image data into three slices and allocates the slices to the cluster assignment processors 301 to 303, respectively, to cause cluster assignment processing to be performed.

The cluster assignment processors 301 to 303 performs cluster assignment processing as in the flowchart shown in FIG. 2 that illustrates the operation of the cluster assignment processing units 111 to 113 in a first embodiment (FIG. 1). The provisional cluster number provided to each sample is stored in a cluster number area 3002 in the memory 300. The cluster information and the number of assignment-destination candidate clusters are stored in the cache memory 311 to 313 attached to the respective cluster assignment processors 301 to 303.

When the number of assignment-destination candidate clusters stored in the cache memory 311 to 313 reaches an externally set threshold for the number of assignment-destination candidate clusters, the cluster assignment processors 301 to 303 each select, as a cluster to be integrated, a cluster identified as an assignment destination earliest. The detailed flow of the operation of selecting the cluster to be integrated is the same as the process flow of the cluster information transferring units 131 to 133 in the first embodiment (FIG. 3). The cluster information on the selected cluster is transferred to a cluster integration information area 3003 in the memory 300 and deleted from the corresponding cache memory. Although the present invention does not define a specific value of the threshold for the number of assignment-destination candidate clusters, in operation, the threshold may be set based on the capacity of the cache memory 311 to 313, for example. Alternatively, the cluster to be integrated may be selected every time the cluster assignment processing is performed for a predetermined number of samples.

The overall control/cluster integration processor 304 performs the cluster integration processing by referring to the cluster information transferred to the cluster integration information area 3003. Specifically, two clusters with the shortest distance between their representative feature vectors are identified and integrated together. Cluster information on the resultant integrated cluster is defined and stored in the cluster integration information area 3003. Further, a cluster number matching list is defined and stored in the cluster integration information area 3003. The cluster number matching list indicates the correspondence between the provisional cluster number provided to each sample and the cluster number after the integration.

After the cluster assignment processors 301 to 303 have processed all the samples in the allocated slices and the overall control/cluster integration processor 304 has finished the cluster integration processing, the overall control/cluster integration processor 304 outputs the cluster information and the cluster number of each sample to the outside. Specifically, the overall control/cluster integration processor 304 sequentially reads the provisional cluster number from the cluster number area 3002. With reference to the cluster number matching list stored in the cluster integration information area 3003, if the cluster indicated by the provisional cluster number has been integrated, the cluster number after the integration is output to the outside via the data input/output I/F 306. Otherwise, the provisional cluster number is output to the outside.

Thus, as described above, in the clustering processing apparatus in this embodiment, the cluster assignment processors 301 to 303 each perform the clustering processing in parallel for the image divided by the overall control/cluster integration processor 304. This enables a speedup in the clustering processing according to the number of divided data blocks of the image, compared with the case of an undivided image.

Further, the cluster assignment processors 301 to 303 select clusters to be integrated, which are then integrated by the overall control/cluster integration processor 304 at any time. This enables fast processing compared with a case where clusters are integrated after the cluster assignment processors 301 to 303 finish all the clustering processing.

In the present invention, the processor architecture of the cluster assignment processors 301 to 303 and the overall control/cluster integration processor 304 is not limited. Processors with the same architecture may be used, or processors with architectures specialized for their respective processing may be used.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-148027, filed Jun. 29, 2010, which is hereby incorporated by reference herein in its entirety.

What is claimed is:

1. A clustering processing apparatus that groups data including a plurality of samples into clusters, comprising:

N clustering units, configured to group, for corresponding one of N data blocks resulting from dividing the data, samples included in the data block into clusters within the data block, each clustering unit sequentially taking each sample included in the corresponding one of the N data blocks as a target sample, grouping the target sample into one of the clusters within the data block, storing, in a first storage unit, cluster information including identification information on each cluster into which the samples are grouped within the data block, and storing, in a second storage unit, sample assignment information indicating the cluster to which the target sample belongs;

a cluster information transferring unit, configured to select, for each of the data blocks, cluster information on a cluster to be integrated from the cluster information stored in the first storage unit when a predetermined condition is met, and transfers the selected cluster information from the first storage unit to a third storage unit; and an updating unit, configured to integrate clusters selected based on the cluster information stored in the third storage unit into an integrated cluster, and updates the sample assignment information stored in the second storage unit based on information of the integrated clusters.

2. The clustering processing apparatus according to claim 1, wherein each of the said N clustering units generates a new cluster if the focused sample cannot be grouped into any clusters, and wherein said cluster information transferring unit determines that the predetermined condition is met when the number of clusters generated by said clustering unit exceeds a threshold.

3. The clustering processing apparatus according to claim 1, wherein said cluster information transferring unit determines that the predetermined condition is met every time the number of samples processed by said clustering unit exceeds a predetermined number.

4. The clustering processing apparatus according to claim 1, wherein the cluster information further includes sample identification information that identifies a latest one of the samples grouped into each cluster, and said cluster information transferring unit selects cluster information on a cluster containing the latest sample that has been taken as the target sample earliest in the respective latest samples of the respective clusters grouped from the data block for which the predetermined condition is met.

5. The clustering processing apparatus according to claim 1, wherein said cluster information transferring unit selects cluster information on a cluster such that the fewest samples belong to the cluster.

6. The clustering processing apparatus according to claim 1, wherein said cluster information transferring unit refrains from selecting a cluster while the number of clusters that have the cluster information transferred to the third storage unit by said cluster information transferring unit and that have not been integrated by said updating unit exceeds a threshold.

7. The clustering processing apparatus according to claim 1, wherein said clustering unit stops clustering processing while the number of clusters that have the cluster information transferred to the third storage unit by said cluster information transferring unit and that have not been integrated by said updating unit exceeds a threshold.

8. The clustering processing apparatus according to claim 1, wherein each sample is each pixel of image data, a feature vector of each sample is a pixel value of each pixel, said cluster information further includes an average of feature vectors of the pixels belonging to each cluster as a representative feature vector, and if there is a cluster among existing clusters such that a distance to the feature vector of the target sample is the shortest and below a threshold, said clustering unit groups the target sample into the cluster and updates the representative feature vector of the cluster, and if not, generates a new cluster and sets the feature vector of the target sample as the representative feature vector of the new cluster.

9. A non-transitory computer readable medium having recorded therein a program for causing a computer to function as a clustering processing apparatus that groups data including a plurality of samples into clusters based on feature vectors of the samples, the apparatus comprising:

N clustering means for grouping, for corresponding one of N data blocks resulting from dividing the data, samples included in the data block into clusters within the data block, each clustering means sequentially taking each sample included in the corresponding one of the N data blocks as a target sample, grouping the target sample into one of the clusters within the data block, storing, in a first storage means, cluster information including identification information on each cluster into which the samples are grouped within the data block, and storing, in second storage means, sample assignment information indicating the cluster to which the target sample belongs;

cluster information transferring means for selecting, for each of the data blocks, cluster information on a cluster to be integrated from the cluster information stored in the first storage means when a predetermined condition is met, and transferring the selected cluster information from the first storage means to third storage means; and updating means for integrating clusters selected based on the cluster information stored in the third storage means into an integrated cluster and updating the sample assignment information stored in the second storage means based on information of the integrated clusters.

10. A clustering processing method executed by a clustering processing apparatus for grouping data including a plurality of samples into clusters based on feature vectors of the samples, comprising:

a processor of the clustering processing apparatus performing the steps of:

a clustering step of grouping, for each of N data blocks resulting from dividing the data, samples included in the data block into clusters within the data block by corresponding one of N clustering processors, each clustering processor sequentially taking each sample included in the corresponding one of the N data blocks as a target sample, grouping the target sample into one of the clusters within the data block, storing, in a first storage unit, cluster information including identification information on each cluster into which the samples are grouped within the data block, and storing, in a second storage unit, sample assignment information indicating the cluster to which the target sample belongs;

a cluster information transferring step of selecting, for each of the data blocks, cluster information on a cluster to be integrated from the cluster information stored in the first storage unit when a predetermined condition is met, and transferring the selected cluster information from the first storage unit to a third storage unit; and an updating step of integrating clusters selected based on the cluster information stored in the third storage unit into an integrated cluster and updating the sample assignment information stored in the second storage unit based on information of the integrated clusters.

* * * * *